(12) United States Patent
Kim

(10) Patent No.: US 6,697,311 B1
(45) Date of Patent: Feb. 24, 2004

(54) METHOD AND APPARATUS FOR MODULATING AND DEMODULATING DATA

(75) Inventor: Dae Young Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/443,209

(22) Filed: Nov. 18, 1999

(30) Foreign Application Priority Data

Nov. 20, 1998 (KR) ............................................. 98-50528
Mar. 6, 1999 (KR) ............................................. 99-7459
Oct. 25, 1999 (KR) ............................................. 99-46305

(51) Int. Cl.[7] ................................................ G11B 5/09
(52) U.S. Cl. ................. 369/59.1; 369/47.19; 369/59.23
(58) Field of Search ...................... 369/47.35, 59.23, 369/59.1, 44.34, 47.25, 59.24, 47.19; 360/8

(56) References Cited

U.S. PATENT DOCUMENTS 5,247,396 A * 9/1993 Nagai et al. .................... 360/8
6,111,833 A * 8/2000 Nakagawa et al. ...... 369/59.23
6,215,751 B1 * 4/2001 Tsuchinaga .............. 369/47.35

FOREIGN PATENT DOCUMENTS

| JP | 62 92144 | 4/1987 |
| JP | 6-20901 | 1/1994 |
| JP | 6-103605 | 4/1994 |
| JP | 10-302407 | 11/1998 |

* cited by examiner

Primary Examiner—William Korzuch
Assistant Examiner—Kim-Kwok Chu
(74) Attorney, Agent, or Firm—Birch, Stewart, Kolasch & Birch, LLP

(57) ABSTRACT

A modulation/demodulation method of a run length limited method and a modulation/demodulation apparatus relate to converting a bit stream of a recording data into a bit stream proper to a recording phase when recording a data onto an optical recording medium. In the present data modulation and demodulation method, modulation data consist of partly consecutive 0s or 1s which are quantized in length, satisfying the given minimum and maximum run lengths of RLL at the same time. Therefore, a reproducing error is checked and corrected based on whether the quantizing condition is violated or not during the demodulation. This error recovery capability makes it possible to enhance a recording density of a recording medium and to reduce a judgement error possibility due to a jitter component of a reproducing signal, so that provides a high reliability for high density recording medium compared to a conventional modulation method.

19 Claims, 6 Drawing Sheets

| | 256 Codes | |
|---|---|---|
| Set 1 | 1,4 | ( the number of leading 0s ) |
| Set 2 | 2,5 | ( the number of leading 0s ) |
| Set 3 | 3,6,9,12,15,17,19,21 | ( the number of leading 0s ) |
| Set 4 | 3,5,7,9,11,13,15,17,19 | ( the number of leading 1s ) |
| Set 5 | 1,3 | ( the number of leading 1s ) |
| Set 6 | 2,4,6,8,10,12,14,16,18,20 | ( the number of leading 1s ) |

US 6,697,311 B1

METHOD AND APPARATUS FOR MODULATING AND DEMODULATING DATA

BACKGROUND OF THE INVENTION

1. Field of the Invention

The present invention relates to a modulation/demodulation method based on a Run Length Limited (RLL) method capable of converting data bit streams to be recorded on an optical recording medium, etc. into bit streams whose format is adequate for recording marks, and relates to a modulation/demodulation apparatus using the same.

2. Description of the Related Art

As a recording medium for recording various format data, a tape which is a magnetic medium, an optical recording medium, etc. are known. A compact disk (CD) among the recording medium is widely used. In addition, as the standard specification of a digital versatile disk (DVD) is developed, the use of the optical recording medium is being increased. As the optical recording medium, various kinds of the optical recording medium such as a CD-ROM, DVD-ROM, which are read-only type, a CD-R, DVD-R, which are writable-once type, a CD-RW, DVD-RAM which are re-writable type, and an optical magnetic type disk, etc. are disclosed until now.

When recording digital data on the above-mentioned optical recording medium, the data are to be modulated for decreasing a drop-out effect of a signal, obtaining a reproduction reliability of a recording signal, and removing a DC component of the signal. An RLL modulation method is generally used when recording digital data to modulate data to be recorded. In the RLL modulation method, the Eight-to-Fourteen Modulation (EFM) method, suggested by Philips, is most widely used.

The EFM method is directed to a modulation method for converting a 8-bit data into a 14-bit code. The modulated code has 2 to 10 zeros between adjacent 1s of the code. This condition may be expressed in a general form like RLL(2, 10).

Since the EFM code requires additional three bits for controlling a Digital Sum Value (DSV), an encoding ratio decreases to 8/17, it is not proper for increasing the recording density of a recording medium. In addition, the EFM method is too sensitive to jitters during the demodulation of data, so that the EFM method is not adequate for the data modulation method for a high-density recording medium.

A New Efficient Modulation (NEM) method has been proposed by Toshiba Union to apply to the high-density optical disk. The NEM method modulates a 8-bit data to a 15-bit code and has a limitation of RLL(2,12). Various modulation methods have been researched except for the NEM method.

In addition, there are still much differences in the reproducing error rate in the modulation methods having a good result for enhancing recording density of a disk medium. Therefore, it is urgently demanded to develop a new modulation method providing high-density of a recording medium and reducing reproduction error rate.

SUMMARY OF THE INVENTION

It is an object of the present invention to provide a modulation/demodulation method of a digital data, and apparatus using the same which are capable of enhancing a recording density of a recording medium and implementing an accurate reproducing operation which is rarely affected by a jitter factor.

To achieve the above objective, there is provided an RLL data modulation method to form more than two bit-groups for a modulation data and to associate a bit-group with one of two recording phases in such a manner that the length of the bit-group recorded into one of the recording phase is quantized by two or greater integer step.

To achieve the above objective, there is provided a demodulation method which is directed to removing a trigger deviation due to jitters by accomplishing such a phase-compensation operation as replacing a bit group whose bit length does not belong to a quantized value with a quantized-length bit group.

Additional advantages, objective and features of the invention will become more apparent from the description which follows.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

DETAILED DESCRIPTION OF THE PREFERRED EMBODIMENTS

Figure 1:
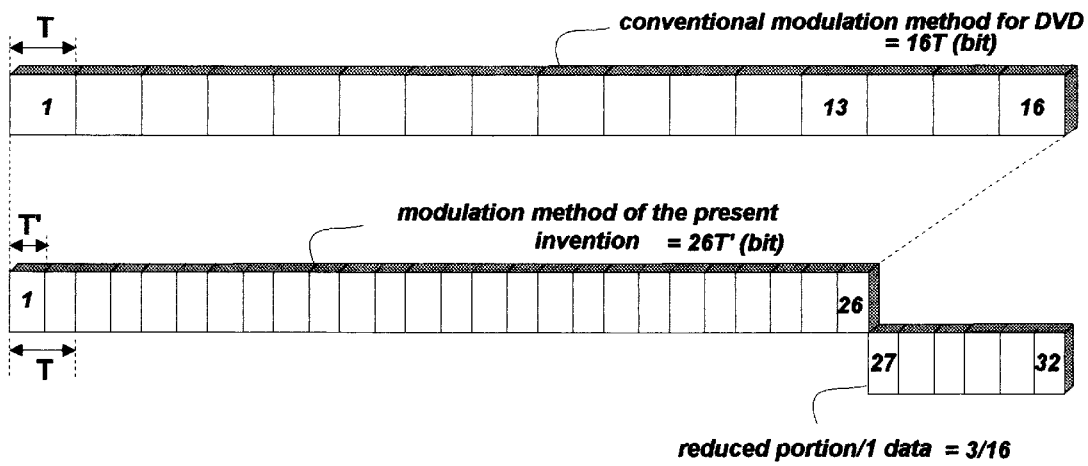
FIG. 1 is a view illustrating a difference of a recording density between a conventional modulation method and a modulation method according to a first embodiment of the present invention.
Figure 2:
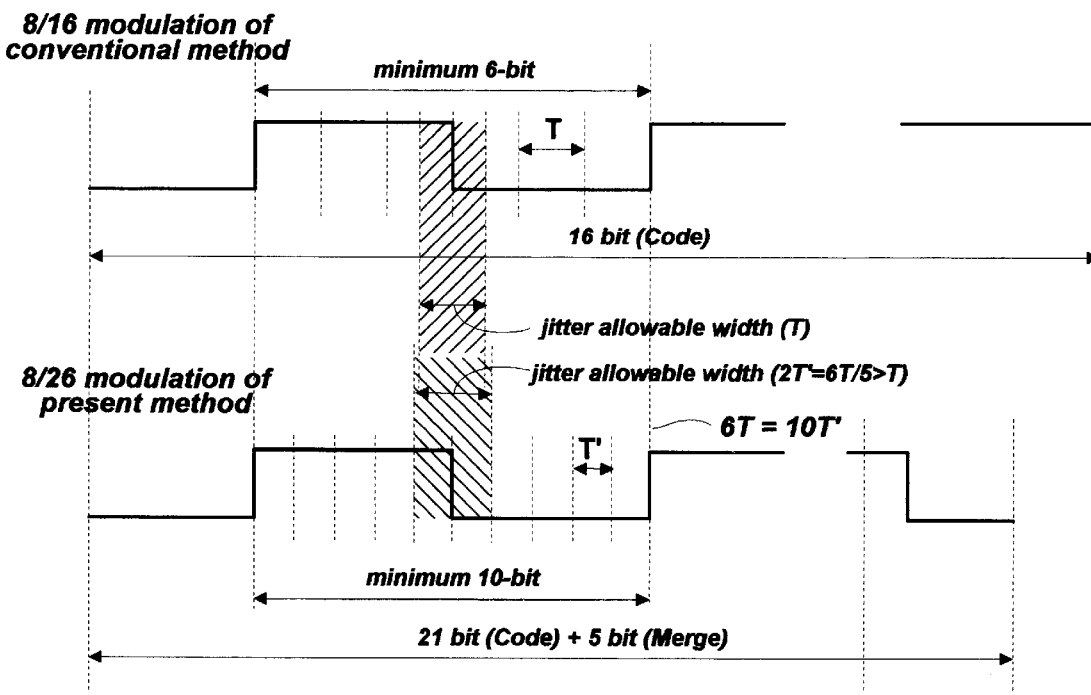
FIG. 2 is a view illustrating a comparison between a conventional modulation method and a modulation method according to a first embodiment of the present invention with respect to the jitter effect when minimum unit bit streams of the two modulation are to occupy the same recording interval.

A data modulation and demodulation method and a data modulation and demodulation apparatus using the same according to the present invention will be explained in detail with reference to the accompanying drawings.

At first, a first embodiment of the present invention will be explained.

A bit group in a bit stream which is modulated from one byte data (1 byte=8 bits)and then recorded into one of two recording phases (The modulated bit stream for one byte is called as "code" hereinafter). The recording phase may be a pit, a medium variation by heat, or magnetized direction according to the disk type. Here, the bit group whose corresponding phase has low reflection ratio with respect to an incident light during reproduction is called as a "mark" group, and the bit group corresponding to the phase having a high reflection ratio is called as a "space" group.

The bit length of one of mark group and space group has the quantized number corresponding to $2n+1$ (n represents an integer) of the unit bit, and the bit length of the other group does not comply with the quantizing condition, namely, the bit length has any value under the condition of the minimum run length and the maximum run length of RLL.

The total bit number of a code modulated is determined such that the quantizing condition and the run length limitation during the RLL modulation must be satisfied with respect to the mark group and can provide 256 or more codes one byte can generate. As the total bit number, there may be a lot values which exceed a certain size. However, in the modulation method according to the first embodiment of the present invention, 21 is determined as the total bit number under the condition that the minimum run length of the RLL modulation is 4 and the maximum run length is 10. In addition, 5-bit is additionally used as merge bits for decreasing DC level and controlling the DSV like the conventional art.

Table 1 illustrates possible modulation conditions with respect to conventional modulation conditions for a CD and DVD medium.

TABLE 1

|  | merge bit number | total bit number | Min. run length | Max. run length | The number of codes |
|---|---|---|---|---|---|
| CD | 3 | 14 | 2 | 10 | 267 |
| DVD | 0 | 16 | 2 | 10 | 566 |
| 1st set | 2 | 13 | 1 | 6 | 262 |
| 2nd set | 3 | 18 | 2 | 8 | 280 |
| 3rd set | 4 | 19 | 3 | 9 | 262 |
| 4th set | 5 | 23 | 4 | 10 | 257 |
| 5th set | 6 | 23 | 5 | 14 | 268 |
| 6th set | 7 | 26 | 6 | 17 | 257 |
| 7th set | 8 | 27 | 7 | 16 | 258 |

Under the foregoing quantizing conditions and the above minimum/maximum run length, the quantum number n may be 2, 3, 4, and 5 due to the condition of $4<2n+1\leq10+1$. Therefore, in the case that the foregoing quantizing condition is adopted for the mark group, the length of mark group is 5, 7, 9 or 11.

4 is selected for the minimum run length since if the value is below 4, the number of possible codes are increased but the level of the reproducing RF is decreased with respect to the mark group of the minimum length, so that a reproduced signal suffers a loss, thereby increasing a reproducing error.

In order to record or reproduce a modulation data set selected in the above-described manner to or from a recording medium, a clock frequency of a corresponding apparatus is to be doubled compared to the conventional EFM method. Therefore, if the input data is modulated in the above-described manner and recorded into a recording medium, the length of recording occupying interval is decreased by 3/16, namely, 18.8% compared to when using the 16-bit code as shown in FIG. 1, which means to enhance a recording density of the recording medium.

Meanwhile, the bit length of a minimum mark group and a minimum space group is all 5-bit under the foregoing condition.

If the interval T corresponding to one bit is set to 0.6T (T represents an interval corresponding to one bit based on the conventional art) so that the interval 10T of a minimum bit group including a minimum mark and a minimum space group according to the present modulation is equal to that (6T) of conventional DVD modulation, the allowable width (hereinafter called "window") in which the mark group quantized by 2T step is judged into a corresponding quantized length becomes 2T, namely, 1.2T with respect to the conventional modulation. Therefore, the allowable width is increased by about 20%. This result shows that even if the edge is shifted by jitters when the recording signal is reproduced, it is possible to suppress jitter effect more efficiently compared to the modulation method used in the conventional DVD. Therefore, it is possible to reproduce recorded data in more stable compared to the conventional art.

In the case that the occupying interval for the minimum bit group is set the same as the conventional method adopted for a DVD, the code length becomes 15.6T (=26T×6T/10T), thereby increasing the recording density by about 2.5%.

In the above-described first embodiment of the present invention, the length of the mark group is quantized to $2n+1$. This quantized condition may be also changed to $2n$. In this changed condition, since the length of the minimum mark group is 6T, the length of the minimum bit group is 11-bit (=11T). Thus, if the occupying interval is set the same as the conventional DVD, i.e., 11T=6T, the window in which an error correction is possible despite of edge shift due to jitters is 1.09T (=2T×6T/11T) which means that the error correction is improved by about 9% compared to the conventional T clock, and the code length becomes 14.18T (=26T×6T/11T), which means that the recording density of a recording medium is increased by about 11.4%.

In order to check that the recording density is increased with respect to code set obtained under various conditions different from the first embodiment of the present invention, the recording density with respect to each set of Table 1 is computed as follows. Table 2 shows a result of the computation.

TABLE 2

| set | merge bit number | total bit number | Min. run length | Max. Run length | total bit number/ minimum unit bit stream | (a) | | (b) | |
|---|---|---|---|---|---|---|---|---|---|
|  |  |  |  |  |  | CD | DVD | CD | DVD |
| 1st | 2 | 13 | 1 | 6 | 3.75 | 0.756 | 0.711 | 2.267 | 2.133 |
| 2nd | 3 | 18 | 2 | 8 | 3.50 | 0.694 | 0.653 | 1.190 | 1.120 |
| 3rd | 4 | 19 | 3 | 9 | 2.88 | 0.986 | 0.928 | 1.478 | 1.391 |
| 4th | 5 | 23 | 4 | 10 | 2.80 | 0.920 | 0.866 | 1.004 | 0.945 |
| 5th | 6 | 23 | 5 | 14 | 2.42 | 1.172 | 1.103 | 1.172 | 1.103 |

TABLE 2-continued

| set | merge bit number | total bit number | Min. run length | Max. Run length | total bit number/ minimum unit bit stream | (a) | | (b) | |
|---|---|---|---|---|---|---|---|---|---|
| | | | | | | CD | DVD | CD | DVD |
| 6th | 7 | 26 | 6 | 17 | 2.36 | 1.122 | 1.056 | 0.898 | 0.845 |
| 7th | 8 | 27 | 7 | 16 | 2.19 | 1.295 | 1.219 | 0.971 | 0.914 |

In the Table 2, (a) represents that the period of the minimum pit is constant, and (b) represents that the window for the edge transition is constant.

In the above description, it was assumed that the quantizing step is 2 with respect to the mark group of the modulation data. As other condition, the quantizing value may be a certain value K greater than 2 without changing the scopes of the first embodiment of the present invention. In the case that the thusly generated modulation data is applied to the modulation/demodulation apparatus, the clock frequency should be higher by K-times compared to the conventional method for a DVD. At this time, the interval T" corresponding to one bit is T/K, and the window to endure jitters becomes KT".

Generalizing the explained condition with respect to the quantized modulation data set, a mark group is larger than r1 and is smaller than r2+2 in length and has a length quantized by a value K (integer equal to or larger than 2) under the condition of RLL(r1,r2). Namely, the length of a mark group has a value of Kn which has a residual value of 0 when dividing the same by the quantizing value K, or a value of Kn+R ($1 \leq R \leq K-1$) having a residual value R which is larger than 0 and smaller than K when dividing the same by K. For the above-described two cases, each mark group has K difference in length.

And in the two cases, the quantizing condition is not applied to the space group. Namely, a space group has any length which is greater than r1 and smaller than r2+2.

In the above-described conditions, the space group may be quantized instead of the mark group. Also both the mark group and the space group may be quantized, which will be explained as another modulation embodiment.

Figure 3:
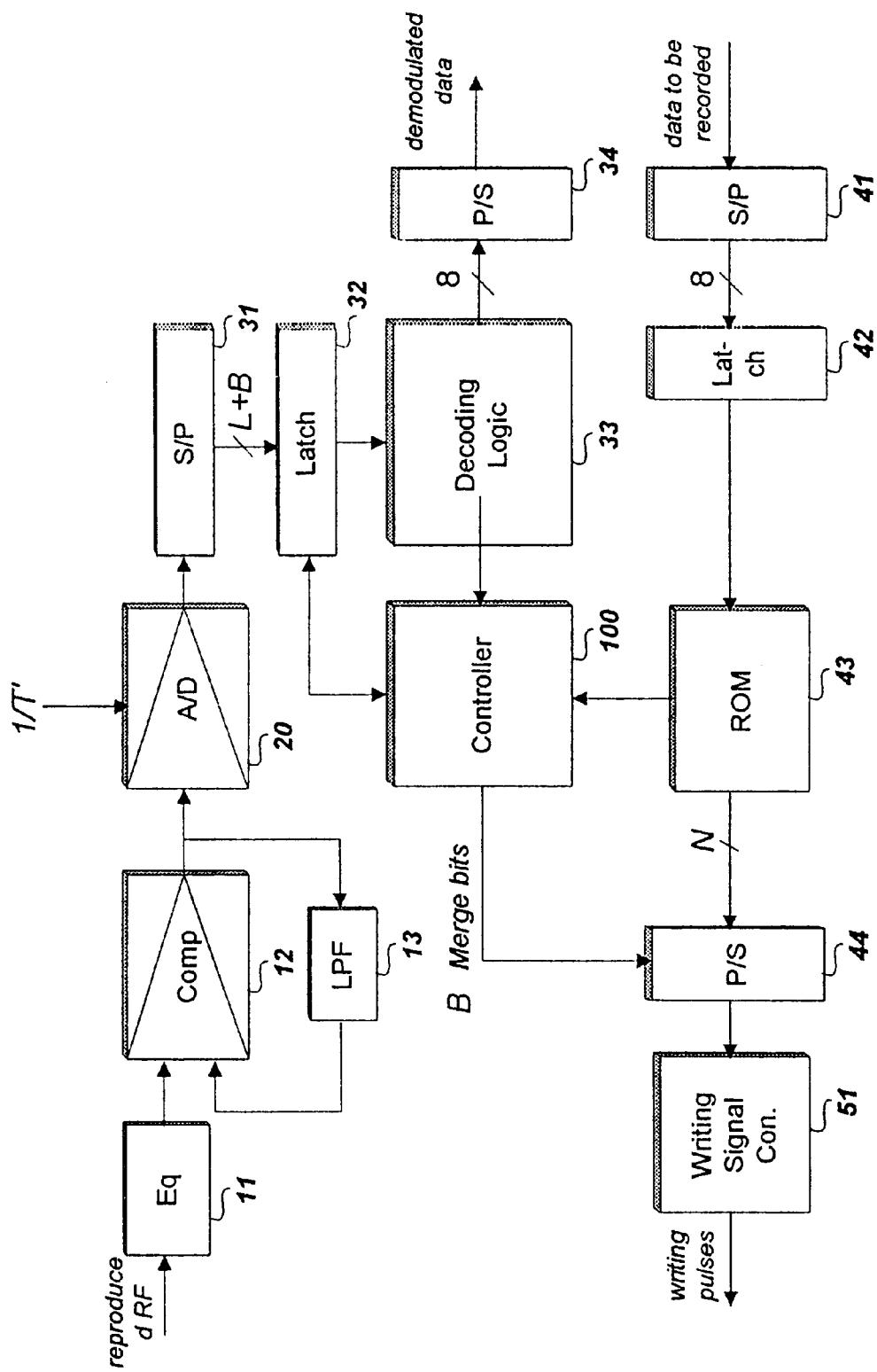
FIG. 3 is a view illustrating the construction of a modulation/demodulation apparatus based on a modulation method according to a first embodiment of the present invention.

FIG. 3 illustrates a block diagram of the data modulation/ demodulation apparatus adopting the above-explained data modulation and demodulation method according to a first embodiment of the present invention. The construction and operation of the data modulation and demodulation apparatus of FIG. 3 will be explained.

As shown in FIG. 3, there are provided an equalizer 11 for amplifying and equalizing reproduced high frequency (RF) signal depending on its amplitude, a comparator 12 for comparing an equalized RF signal with a slice level and converting the same into a binary signal, a lowpass filter 13 for detecting an average level of the binary signal and providing the average level as the slice level, an A/D converter 20 for sampling the converted binary signal at a sampling frequency 1/T' and outputting a digital bit stream, a first serial/parallel converter 31 for converting the digital bit stream into a parallel data of N+B (N is code length, and B is merge bit length), a first latch 32 for latching the converted parallel data, a decoder 33 formed from a Programmable Logic Array (PLA) for restoring the latched data into a 8-bit data which is original one the modulation is not performed with, a second serial/parallel converter 34 for converting the restored 8-bit data into serial data, a third serial/parallel converter 41 for converting the 8-bit serial data into a parallel data, a second latch 42, a read only memory(ROM) 43 for storing addresses corresponding to the values of all N-bit data chosen as code, a fourth serial/parallel converter 44 for converting a N-bit parallel data from the ROM 43 into a serial data, a writing signal converter 51 for generating a writing signal according to bit stream from the fourth serial/parallel converter 44, and a controller 100 for compensating the restored data based on a demodulation error of the decoder 33 and adding a B-bit merge bit to the N-bit code in the fourth serial/parallel converter 44.

In the thusly constituted data modulation/demodulation apparatus, when a data to be recorded is inputted in a serial data format, the third serial/parallel converter 41 converts into a 8-bit parallel data and the second latch 42 holds the 8-bit parallel data temporally. The data held by the second latch 42 are applied to the ROM 43 as an address signal. When the address is applied to the ROM 43 and an access signal is activated, the ROM 43 outputs a N-bit data stored in the address, and then a modulation code is transmitted to the fourth serial/parallel converter 44. At this time, the controller 100 checks a modulated code outputted from the ROM 43, determines a merge bit of B-bit following the previously outputted modulated code based on the just-modulated code, and prepositions the merge bit to data of the fourth serial/parallel converter 44. Then the fourth serial/ parallel converter 44 is enabled to shift out, so that the modulated data of the entire B+N bits are serially outputted. The thusly outputted modulated data are converted into a writing signal adequate for generating a light beam according to the high and low level of the modulated data by the writing signal converter 51, and are applied to a writing beam driving unit (not shown) of the next circuit, so that a modulated data corresponding to the inputted data are recorded on the recording medium.

The transfer of the serial data among the above elements during the recording operation of the modulation/ demodulation apparatus is performed by a driving clock 1/T' of the apparatus whose operational speed is increased by T/T' compared to the conventional modulation device.

The data recorded on the recording medium in accordance with the above-described modulation method is reproduced in an RF signal. The process for demodulating the reproduced RF signal to an original data will be explained.

When an RF signal reproduced from the recording medium is applied to the equalizer 11, the equalizer 11 having different amplifying coefficients for various period of the inputted signal controls each level to be amplified differently for each period of the signal depending upon each amplification coefficients to produce a RF signal having a uniform amplitude. The thusly equalized RF signal is then compared with the slice level applied to the comparator 12 as a reference signal and is converted into a binary signal having only two state of high and low. A same state interval in the binary signal has duration corresponding to width of a recording phase adjacent to two other phases of a recording medium.

The lowpass filter 13 filters out alternating signal and to output an average level, i.e., DC component of the binary signal outputted from the comparator 12. The thusly obtained DC level is used as the slice level which is a reference signal of the comparator 12. Therefore, the slice level is adjusted to adapt the level of reproduced signal or an amount of light reflected from the recording medium.

The binary signal having pulse trains converted with respect to the slice level is applied to the A/D converter 20 and is outputted in a digital bit stream at a sampling speed of 1/T' Hz, and this bit stream is converted into a parallel data by the first serial/parallel converter 31 by the unit of N+B bits and is temporarily stored in the first latch 32.

The parallel data temporarily stored in the first latch 32 is retrieved into the decoder 33 under the control of the controller 100 and then data recovering process is performed in the decoder 33. At first, the decoder 33 removes a merge bit of B-bit from the received parallel data and exclusively ORs the 1-bit delayed value and the currently inputted bit value for the N-bit data whereby the sampled N-bit code becomes to have is where level transitions occur. For example, the bit stream form of " . . . 00001111110000011 . . . " is converted into " . . . 00001000001000010 . . . ". The latter bit stream may be one of the modulation codes stored in the ROM 43.

The bit stream converted into the modulation code is to be restored into an original data of 8-bit. At this time, when a decoding error occurs in the decoding circuit, the controller 100 reads out a data of N+B bit latched by the first latch 32, checks the length of the consecutive is corresponding to a mark group, and detects whether the length complies with the quantized value of the modulation data or not. That is, if the currently adopted quantizing condition of the modulation data is 2n+1, it is checked whether the length of mark groups is 5, 7, 9 or 11.

If the length does not comply with the quantizing condition, the value of 0 following consecutive 1s is replaced with 1. For example, if the length is 4, the value of 0 positioned next the series four is is changed to 1 for thereby generating series five 1s. If the length is 6, the value of 0 positioned next the six is is corrected to 1 to form series of seven 1s. Such a correction is grounded on the following reasons.

Figure 4:
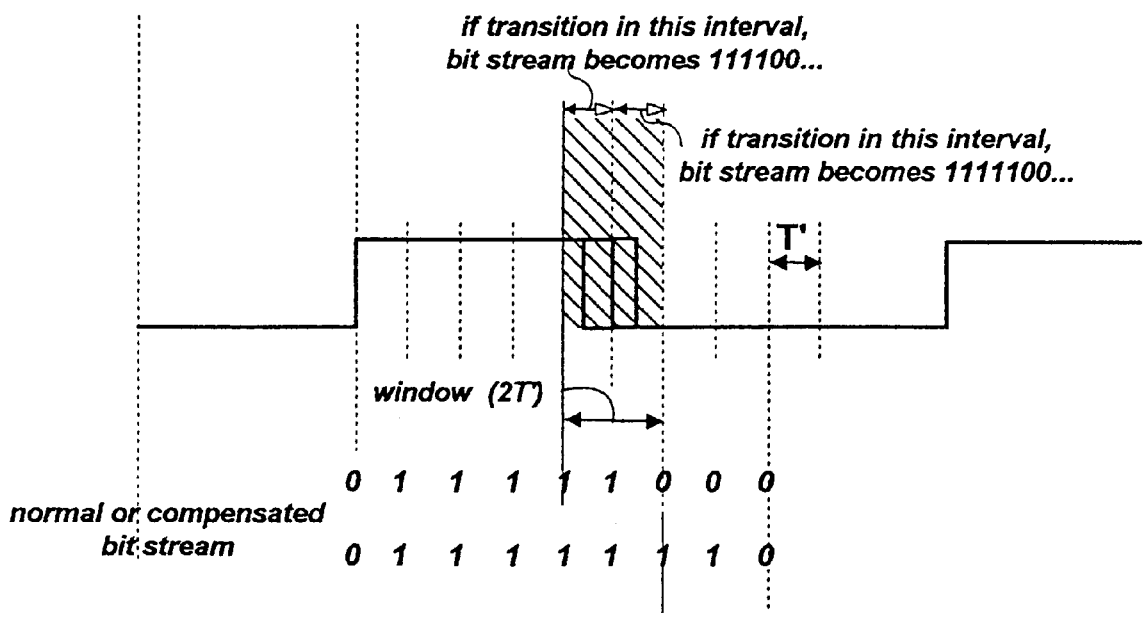
FIG. 4 is a view illustrating a method for compensating a transition deviation of bit trains when a data is demodulated based on a demodulation method according to a first embodiment of the present invention.

Since the window of the level transition is 2 as shown FIG. 4, if the level transition position is disturbed so that the high level duration time $T_H$ becomes $4T'(=111100 \ldots) \leq T_H < 6T'(=1111110 \ldots)$, the number of consecutive 1s sampled by the A/D converter 20 is 4 or 5. At this time, it is deemed that the recording interval is 5T'. And in the case of $6T'(=11111100\ldots) \leq T_H < 8T'(=111111110\ldots)$, it is also deemed that the data are recorded as 7T'.

After the bit value of the first latch 32 is partially corrected and compensated, this data is applied to the decoder 33 again. Thereafter, the normal decoding operation is performed, that is, the data is recovered into the original 8-bit data, and the thusly recovered data is converted into a serial data by the second serial/parallel converter 34 and is then transmitted to an exterior apparatus which has requested a reproduction of a recorded medium.

For reference, in the above-described demodulation process, the controller 100 may check the bit stream stored in the first latch 32 prior to the decoding operation of the decoder 33, detect the quantizing error of the bit length, and compensate the same to recovery errors occurred during the reproduction, instead of checking a bit stream temporarily stored in the first latch 32 in the case that a decoding error occurred in the decoder 33 and updating the bit value which does not comply with the designated quantizing condition.

The second embodiment of the present invention will be explained with reference to the accompanying drawings.

In the second embodiment of the present invention, the length of one of mark group and space group is quantized with N (N≧2, N is natural number) step, and for the other group, its length is quantized with M (M is natural number, M and N are coprime each other) step. And the length of each group has a certain value satisfying the minimum run length and the maximum run length which are given under the RLL condition.

The total bit number of a modulation code is determined such that the quantizing condition and the run length limit must be satisfied with respect to the mark and the space group and can provide 256 or more modulation codes one byte can generate. As the bit number of a code satisfying the above-described conditions, there may be a lot values if exceed a certain size, so that 32 is chosen as code size in the second embodiment under the condition that the minimum run length of the code is 4, and the maximum run length is 18. And 5-bit is further used as merge bits for decreasing DC level and controlling DSV like in the conventional art.

In addition, under the foregoing quantizing conditions, N is selected to 2 for the space group, and M is 3 for the mark group.

Under the RLL condition that the minimum run length is 4 and the maximum run length is 18, the length $2k$ of the space group of the modulation data is 6, 8, 10, 12, 14, 16 or 18 in accordance with a condition of $4<2k\leq18+1$, and the length $3l$ of the mark group of the modulation data is 6, 9, 12, 15 or 18 in accordance with a condition of $4<3l\leq18+1$.

4 is chosen as the minimum run length in the second embodiment on the ground that if the minimum run length is below than 4, the level of the reproducing RF is decreased with respect to the mark group or space group of the minimum run length, so that a possibility of the reproducing error is increased.

The clock speed (1/T) of an apparatus for recording or reproducing a modulation data to or from a recording medium is chosen to exceed multiple of 32/16 (=2) of the conventional clock speed (1/T') under the assumption that the conventional ESM (Eight-to-Sixteen modulation) method uses 16-bit code, the method of the present invention uses 32-bit code, and recording area for a code occupies the same physical length for both methods. If the clock speed is doubled for the conventional speed, the recording density is same as the conventional method, however the reproducing error is remarkably decreased. If the clock speed is more than twice, the reproducing error is decreased, and the width of the recording occupying interval is also decreased compared to when using the conventional 16-bit code scheme, which increases recording density of a recording medium.

In the above descriptions, it was assumed that the quantized steps are 2 and 3 for the space group and mark group respectively. However, the quantizing value may be also set to other value by applying the above-described principle of the embodiment of the present invention.

Figure 5:
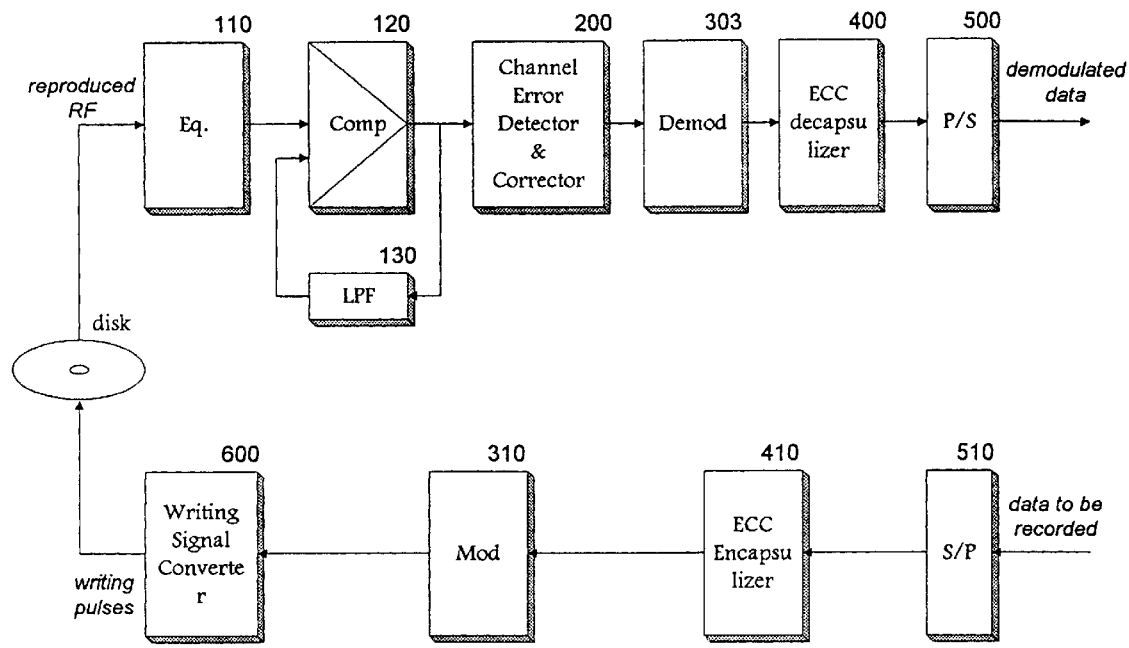
FIG. 5 is a view illustrating the construction of a modulation/demodulation apparatus based on a modulation/demodulation method according to a second embodiment oaf the present invention.

FIG. 5 illustrates a block diagram of a data modulation/demodulation apparatus which uses a data modulation/demodulation method according to the second embodiment of the present invention. The operation of the data modulation/demodulation apparatus embodying the present invention will be explained with reference to FIG. 5.

As shown in FIG. 5, there are provided an equalizer 110 for amplifying and equalizing a reproduced RF signal depending on its amplitude, a comparator 120 for comparing an equalized RF signal with a slice level and outputting a binary signal, a lowpass filter 130 for detecting an average level of the binary signal and providing the average level as the slice level, an error correction unit 200 for detecting and correcting a reproducing error of the binary signal from the comparator 120, a demodulator 300 for recovering the corrected modulation code to an original data the modulation is not performed with, an ECC error correction unit 400 for detecting an ECC error in the demodulated data and correcting the error if any, an ECC encoder 410 for performing an ECC process with the inputted data, a modulator 310 for converting the ECC encapsulated data into a corresponding modulation code based on the modulation method according to the present invention, and a writing signal converter 600 for generating a writing signal according to the modulated data bit stream.

In the thusly constituted data modulation/demodulation apparatus, when data to be recorded are inputted, the ECC encoder 410 performs an ECC process in which an outer parity and inner parity are added to the input data by unit of the ECC block. The modulator 310 reads out a L-bit modulation code corresponding to each 8-bit data in the ECC encapsulated data block from an external ROM (not shown) and outputs the same. At this time, the B-bit merge bit determined based on the just-modulated code is to be appended to the previously outputted modulated code, so that the modulation data of the entire L+B bits are outputted in series.

The thusly outputted modulation code are converted into a writing signal for generating light beam based on the modulation code by the writing signal converter 600 and is applied to a writing beam driver (not shown) of the next circuit, so that a modulated code corresponding to the inputted data are recorded on the recording medium.

The serial data are transferred among the above elements by a driving clock 1/T' which is faster than the conventional clock of period T.

The data recorded on the recording medium by the above-described modulation method is picked up as analog signal of high frequency during the reproducing operation. The process for demodulating the reproduced high frequency signal into the original data format will be explained.

When a high frequency signal reproduced from the recording medium is applied to the equalizer 110, the equalizer 110 amplifies the inputted signal based on amplification ratios which are: different in accordance with the level of the inputted signal and produces a high frequency signal having a uniform amplitude. The thusly equalized high frequency signal is compared with the slice level applied to the comparator 120 as a reference signal and is converted into bi-level signal. A level duration of a state in the bi-level signal is equal to the length of corresponding recording phase.

The lowpass filter 130 obtains an average level, namely, the DC level of the bi-level signal from the comparator 120, the thusly obtained DC level is feedbacked to the comparator 120 as a slice level. Such a feedback of DC level enables the slice level to be adapted to the level of currently reproduced signal or an amount of light reflected from the recording medium.

The signal converted into bi-level signal with respect to the slice level is applied to the A/D converter 200 and is outputted in digital bit stream at a sampling speed of 1/T' Hz, and the bit stream is converted into a parallel data of L+B bits and is then error-corrected by the error correction unit 200.

The error correction unit 200 checks the length of the consecutive is corresponding to the mark group and detects whether the length does not comply with the quantized value. If the checked length does not comply with the quantizing condition, one or more bit values are corrected such that the length has one of quantized values. This process is as follows.

Figure 6:
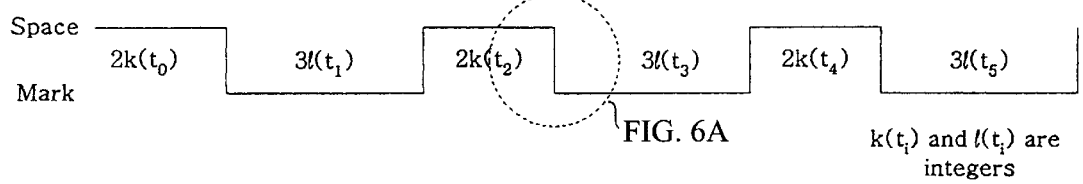
FIGS. 6 and 6A are views illustrating the possibility of the edge triggering error when demodulating the modulated data according to a second embodiment of the present invention.
Figure 6A:
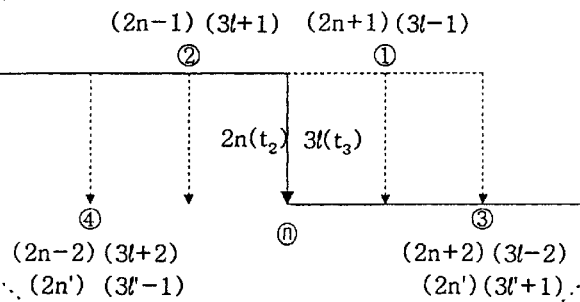

Without error with signal during reproduction, a signal transition would occur at a normal position which satisfies the quantizing conditions $2k$ and $3l$ for the space group and the mark group. However, if the edge point of the level transition is shifted due to a jitter factor during the reproducing operation, as shown in FIG. 6, a falling edge, for example, occurs before or after a certain time compared to when the edge is in normal position. Such a error is checked and corrected as follows.

First, if the space group does not satisfy the quantizing condition $2k$ at the detected edge-point, it is judged that there is triggering error by unstable reproduced signal. In this case, it is possible to know that there occurs an error that a corresponding space group does not satisfy the quantizing condition from the edge difference from the normal position but it is impossible to know where the normal point for the error edge is based on only the length of space group.

For example, assuming that the error edge point is ① of FIG. 6, it is impossible to determine whether the error edge corresponds to the case that the length of the space group is decreased compared to the normal edge point ③, namely, $2k-1$, or corresponds to the case that the length of the space group is increased compared to the normal edge point Ⓝ, namely, $2k+1$.

Therefore, in order to determine normal edge position for the error detected edge, the quantizing condition is also checked with respect to the mark group neighboring the space group containing edge error.

The reason to check the neighboring mark group is why the edge of the neighboring mark group is also shifted from the normal point $3l$ if the edge point of the space group is moved. In the above example of FIG. 6, if the length of the mark group is $3l+1$, the length of the mark group must be decresed and the length of the space group must be increased in order to satisfy the quantizing condition with respect to both groups. Therefore, trio position Ⓝ can be determined as normal falling edge. If the length of the mark group is $3l-1$, the length of the mark group was decreased and the length of the space group is to be increased. Therefore, the error edge can be corrected to Ⓝ.

For detailed example, assuming that a part of the bit stream outputted by the comparator 120 is " . . . 10000000010000001 . . . " and there is 1-bit shift error, the bit stream is error-corrected to " . . . 1000100000010000001 . . . " by the above-described process, and this corrected bit stream becomes one of the modulation codes stored in the ROM (not shown).

In addition, even if the space group satisfies the normal quantizing condition $2k$ at the detected edge point, the edge may be error one. For instance, where the detected edge is at position ③ satisfying the quantized value of $2k+2=2k'$, it may be error edge shifted longer by 2 from the normal edge point Ⓝ. And where the detected edge is at position 4 satisfying the quantized value of $2k-2=2k'$, it may be error edge shifted shorter by 2. In these cases, it should be determined if the edge of the detected space group is normal or error based on whether the length of the neighboring mark group is 3*l*−2, 3*l*+2, or 3*l*. If the error edge and the length of the right mark group is 3*l*−2; it may be shifted to the right side by 2 under consideration of only space group. However, since such a rightward shift makes the length of right ark group which does not satisfies the quantizing condition, it must be shifted to the left by 2 to satisfy the both quantizing conditions of the space group and mark group. The shift operation for error edge based on both quantizing condition of mark and space group enables to obtain correct position of error edge.

In the above-described embodiment of the present invention, the method for checking the normal position of the edge based on an interrelationship of the error-detected space group and the mark group following the space group was explained. However, if the mark group following the error space group satisfies the normal quantizing condition, it is needed to determine the normal position of the edge based on the interrelationship with the mark group preceding the error space group. In addition, if the neighboring two mark groups satisfy the quantizing condition, it is needed to determine the normal edge position based on the space group and mark group two or more apart from the error space group.

Figure 7A:
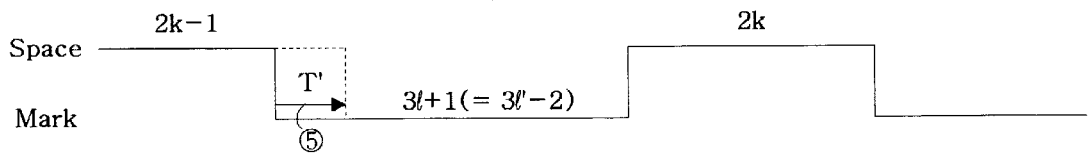
FIGS. 7A to 7C are views illustrating edge correction of mark groups neighboring space groups by checking the quantizing condition when demodulating the modulated data according to a second embodiment of the present invention.
Figure 7B:
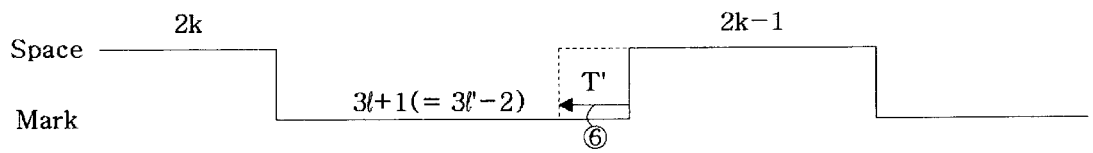
Figure 7C:
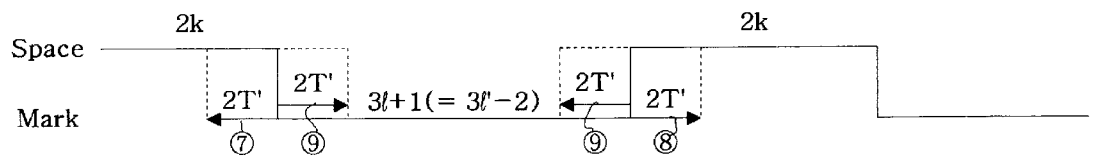
Figure 8:
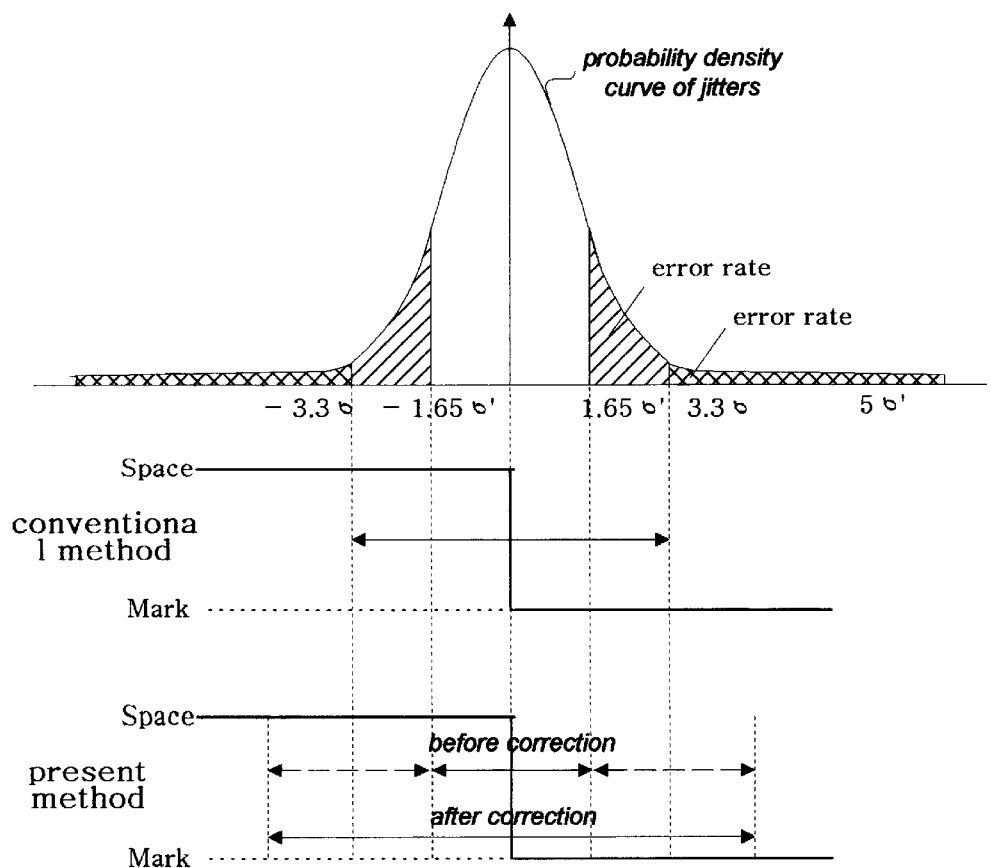
FIG. 8 is a view illustrating a comparison of reproduction error rates between a demodulation method according to a second embodiment of the present invention and a conventional demodulation method for a DVD.

FIGS. 7A to 7C illustrate other examples showing the interrelationship of mark and space groups. Each example will be explained.

As shown in FIG. 7A, if it is judged that the mark group does not satisfy the quantizing condition 3*l* since its length is 3*l*+1 at the detected edge point, and if the space group following the error detected mark group satisfies the quantizing condition and the space group preceding the error mark group has a length of 2*k*−1 which does not satisfy the quantizing condition, the error of the mark group can be corrected by shifting the leading edge of the mark group to the right side by 1 as shown by the label ⑤ in FIG. 7A.

As shown in FIG. 7B, if the length of the space group following the mark group is 2*k*−1, the error of the mark group can be corrected by shifting the trailing edge of the mark group to the left side by 1 as shown by the label ⑥ of FIG. 7B.

As shown in FIG. 7C, in the case that the both space groups just-neighboring the error mark group satisfies the quantizing condition 2*k*, the following several possibilities may be considered for the edge disturbance.

The first case is that the left space group of the mark group as disturbed to extend to the right side by 2 compared to the normal case 2*k'*. At this time, the leading edge of the mark group is to be shifted to the left by 2T' as shown by the label ⑦ of FIG. 7C, so that it is possible to correct the error by shifting 1 of the bit stream by 2-bit.

The second case is that the right space group was disturbed to extend to the left by 2 compared to the normal case 2*k'*. At this time, the trailing edge of the mark group is to be shifted to the right by 2T' as shown by the label 8 of FIG. 7C, so that the error can be corrected by shifting 1 of the bit stream by 2-bit.

The third case is that the space groups at both sides of the mark group are disturbed to be decreased by 2 compared to the normal 2*k'*. In this case, 3*l*+1 of the mark group is to be 3*l'*+4. That is, it is possible to correct the error by shifting the leading and trailing edges of the mark group to each side by 2T' as shown by the label 9 of FIG. 7C.

Consequently, determining the correct position for error edge, it is sufficient to consider the quantizing condition of the neighboring space group like the cases of FIGS. 7A and 7B. However, there is a case like the FIG. 7C in which it is impossible to select correct one by considering only the quantizing condition of the neighboring space group due to several possible edge positions. In this case, the error may be corrected by further considering the quantizing condition of the mark groups adjacent to the neighboring space groups.

When a code of bit stream outputted from the comparator 120 is corrected like the above examples, the demodulator 300 recovers the corrected code into an original 8-bit data, and the thusly recovered data is outputted as a normal reproduced data, and then the ECC error correction unit 400 decapsulates the reproduced data by unit ECC block and transmits error-free data to the apparatus which has requested a reproduction from a recording medium.

In the above-described demodulating process, the error is corrected by checking whether the bit stream outputted from the comparator 120 does not comply with the quantizing condition before the demodulation operation is performed by the demodulator 300. To embody other correction sequence, the quantizing error may be detected and corrected for an output bit stream of the comparator 120 when the demodulated data has an error after the demodulation operation is performed.

In the above-described second embodiment of the present invention, the lengths of the space group and the mark group are quantized by N and M and thus a code whose length is N+1, N+2, for space group or is M+1, M+2, . . . for mark group is considered to have edge error. However, it is also possible for the length of the space group and mark group to be quantized by condition of (multiple number of N)+N1 ($1 \leq N1 < N$) and (multiple of M)+M1 ($1 \leq M1 < M$).

FIG. 3 shows comparison of error rate difference. In the assumption that the standard deviation of the jitter is σ=15% in the conventional demodulation for a DVD, since the probability of the edge triggering error is P(|Z|>0.5(T)), and 0,5T is 3,3σ, the error rate is P(|Z|>3.3σ)=0.0009. Meanwhile, if the clock width of the present method is reduced to ½ compared to conventional clock width, the standard deviation σ' is 30% under the condition of the same jitter amount. Therefore, the error rate of the edge trigger has a very high value of P(|Z|>0.5(T'))=1.65σ'=0.1, however, the error rate due to the jitter of the edge variation exceeding 1.5T' (=5σ') can be remarkably reduced by considering the quantizing condition of the modulation data, which means that the jitter margin is increased and the error rate which can not be corrected drops below 0.0009.

The third embodiment of the present invention will be explained with reference to the accompanying drawings.

In the third embodiment of the present invention, it is assumed that the data values corresponding to the mark and space group are 0 and 1 respectively, the minimum length of the mark group is 3T' in which two 0s exist between 1 and 1, and the minimum length of the space group is also 3T' in which two 1s exist between 0 and 0, and the maximum length of the mark group is 21T' in which zeros (0) exist in series between 1 and 1. The mark group is increased by 3T', and the space group is increased by 2T'. When the bit length of the mark group exceeds a certain bit length, for example, 15T', the mark group is then increased by 2T'.

In other words, as explained in the second embodiment according to the present invention, the bit lengths of the mark and space group are increased by 3T' and 2T', respectively, which corresponds to the coprime condition such as M=3 and N=2. However, in third embodiment, when the bit length of the mark group exceeds a certain bit length, for example, 15T' which is a relatively long length where jitters are weak, then the bit length is increased by 2T' instead of 3T' which corresponds to M=3. This multi quantizing condition (M=3 and Q=2) for one bit-group can provide more codes from the given bit length of a code.

The above-described condition may be expressed in a certain form, for example, RLL(dm, ds, (Cm), k). This expression may be interpreted differently from the conventional RLL(r1,r2). Namely, dm and ds correspond to the minimum run length of the mark and space group, respectively. In the above assumption, since the minimum bit lengths of the mark and space are all 3T', the values of dm and ds are all 2. In addition, Cm indicates the bit number to change increasing step for the mark group being increased by 3T', so that Cm is 15.

The constant k corresponds to the maximum run length of the mark and the space group. In the above-described assumption, since the maximum bit lengths of the mark and space are 21T', that is, the number of consecutive 0s between 1 and 1 are 20, k is 20. The given condition in the above may be expressed in the form of RLL(2,2,(15),20).

Since the space group increases the bit length by 2T' starting from the minimum bit length of 3T', the space group has bit length of 3T', 5T', 7T', 9T', 11T', 13T', 15T', 17T', 19T', or 21T'. And since the mark group increases the bit length by 3T' starting from the minimum bit length of 3T', the mark has a bit length of 3T', 6T', 9T', 12T', or 15T'. After 15T', the bit length is increased by 2T', so that the bit length beyond 15T' becomes 17T', 19T' or 21T'. As a result, the mark group has bit length of 3T', 6T', 9T', 12T', 15T', 17T', or 21T'.

The total bit number of a unit code is to be determined such that the above-described condition is satisfied and 256 or more codes are provided. Thus, 24 is determined as total bit number in this embodiment. The codes having length 24 are classified into 6 code sets which have 256 codes in total as shown in FIG. 9.

Figures 9, 10:
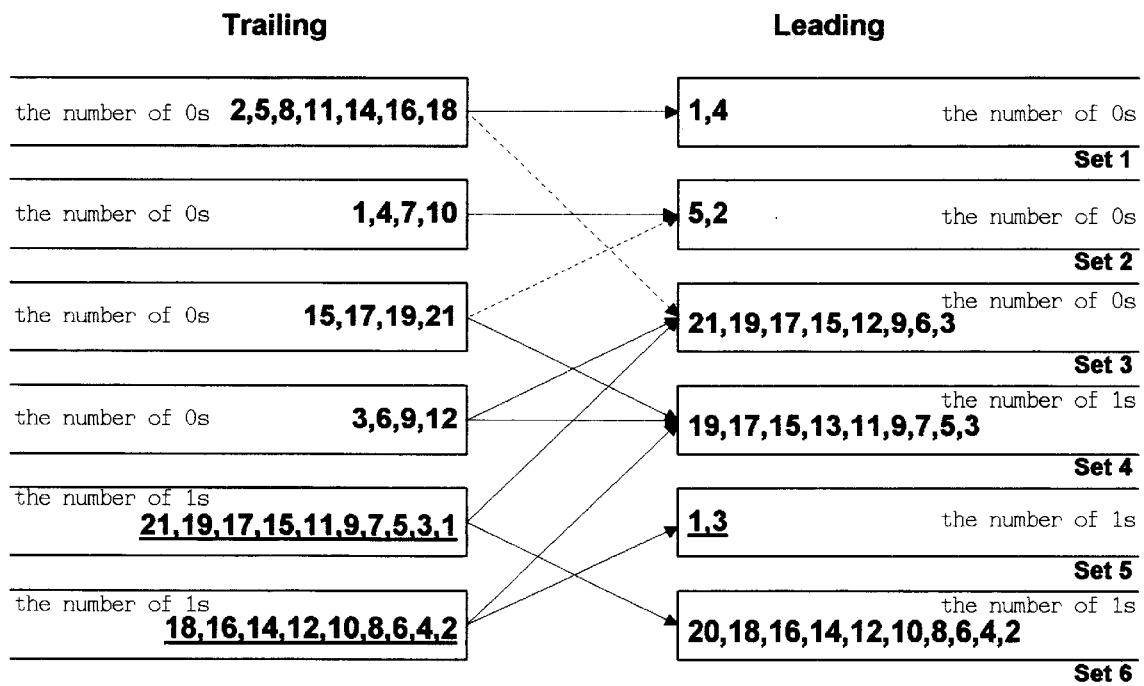
FIG. 9 is a view illustrating code sets according to a third embodiment of the present invention.
FIG. 10 is a view illustrating a code set selection method according to a third embodiment of the present invention.

The code sets of FIG. 9 are classified based on the leading portion at which each code starts. The codes in the first set have the leading portion of one or four zeros, the codes in the second set have the leading portion of two or five zeros. In addition, the codes of the third step have the leading portion of three, six, nine, twelve, fifteen, seventeen, nineteen or twenty one 0s, and the codes of the fourth set have the leading portion of three five, seven, eleven, thirteen, fifteen or nineteen 1s. In the fifth set, the leading portion is one or three is, and in the sixth set, the leading portion is two, four, six, eight, ten, twelve, fourteen, sixteen, eighteen or twenty 1s.

The selection method of code set among 6 sets is shown in FIG. 10. The code set is selected based on the trailing portion of a preceding code. The trailing portion is also divided into 6 groups. The trailing portion of the first group has two, five, eight, eleven, fourteen, sixteen or eighteen 0s, the second group is for trailing portion of one, four, seven, or ten 0s, the third group for trailing portion of fifteen, seventeen, nineteen, or twenty one 0s, the fourth group for trailing portion of three, six, nine, or twelve 0s, the fifth group for trailing portion of one, three, five, seven, nine, eleven, fifteen, seventeen, nineteen, or twenty one 1s, and the sixth group for trailing portion of two, four, six, eight, ten, twelve, fourteen, sixteen, or eighteen 1s.

If a preceding code is chosen on modulation, it is determined which group the chosen code belongs to, the code set for next code is selected depending upon the determined group of a preceding code according to the rules of FIG. 10, and then a modulation code in the selected code set is outputted for a input data. In the case that there are two or more code sets corresponding to the group for a preceding code, the code set which minimizes the DSV is selected.

For example, if a code having trailing zeros of 2, 5, 8, 11, 14, 16, or 18 is followed by a next code having one leading zero of the first code set, connection consecutive 0 bits are 3T', 6T', 9T', 12T', 15T', 17T', or 19T' in length which satisfies the quantizing condition for the mark group. If a code having trailing zeros of 2, 5, 8, 11, 14, 16, or 18 is followed by a next code having four leading zeros of the first code set, the length of connection consecutive 0 bits becomes 6T', 9T', 12T', 15T', 18T', 20T', or 22T'. However, the latter part of 18T', 20T' and 22T'does not satisfy the mark quantizing condition, a code having fourteen, sixteen, or eighteen consecutive 0s in trailing portion is to be connected with a code having three leading 0s in the third code set so that the length of connection consecutive 0 bits is 17T', 19T', or 21T' which satisfies the mark length quantized by the above condition.

In addition, a code having two trailing 0s may be followed by a code having one leading 0 in the first set or a code having twenty one leading 0s in the third code set. In this case, the code to obtain minimum DSV, namely, the code having 19 leading 0s of the third code set may be selected.

The bit stream satisfying the quantizing condition and run length limit condition expressed by the RLL(dm, ds, (Cm), k) increase the jitter margin and decrease the error rate which is not corrected, as explained hereinbefore for the first and second embodiment.

The modulation/demodulation method and a modulation/demodulation apparatus using the said method according to the present invention enhance the recording density of a recording medium, and decrease the triggering error due to jitters of the reproducing signal, thereby increasing reproduction reliability for data recorded in high density.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. A RLL (Run length Limited) data modulation method, comprising the step of forming more than two bit groups of a modulation data in such a manner that the length of a bit group recorded into one of two recording phases of a recording medium is quantized by two or greater integer step, wherein the length of a bit group recorded into the other phase is not quantized.

2. A method of claim 1, wherein the length of a bit group corresponding to one of the two recording phases is quantized by an integer N which is equal to or greater than 2 and the length of a bit group corresponding to the other recording phase is quantized by an integer M which is a coprime of said N.

3. A method of claim 2, wherein said N is 2 and said M is 3.

4. A method of claim 1, wherein the length of a bit group corresponding to one of the two recording phases is quantized by an integer N which is equal to or greater than 2 and the length of a bit group corresponding the other recording phase is quantized by an integer M up to a predetermined length and is quantized by an integer Q beyond said predetermined length, wherein said M which is a coprime of said N and said Q is smaller than said M.

5. A method of claim 4, herein said Q is equal to said N.

6. A data demodulation method in reproducing data from a recording medium, comprising the steps of:
   (a) converting a RF signal reproduced from the recording medium into a bi-level signal based on a reference level; and
   (b) converting a positive or negative duration of the bi-level signal into a bit stream whose bit length is quantized by two or greater integer step,
      wherein said step (b) includes:
         (b1) checking a duration error in the converted bi-level signal and correcting the duration error; and
         (b2) converting the corrected duration of one level into bit streams whose length is quantized by N and converting the corrected duration of the other level into bit stream in whose length is quantized by M, wherein said N is two or greater than 2 and said M is a coprime of said N.

7. A method of claim 6, wherein said step (b) has the bit stream quantized so that a residual value obtained by dividing the length difference between the bit stream and the minimum bit stream by a predetermined value is 0.

8. A method of claim 6, wherein said step (b1) checks whether each neighboring positive or negative duration satisfies a given quantizing condition, and then corrects the duration based on the check result.

9. A method of claim 6, wherein said step (b1) includes the steps of:
   detecting a reproducing error based on whether the duration of the converted bi-level signal satisfies a given quantizing condition or not;
   checking an error position and direction to correct based on whether a positive or negative duration neighboring the error detected duration satisfies a given quantizing condition; and
   correcting the error detected duration based on the checked position and the direction to correct.

10. A data demodulation method in reproducing data from a recording medium, comprising the steps of:
    (a) converting a RF signal reproduced from the recording medium into a bi-level signal based on a reference level; and
    (b) converting a positive or negative duration of the bi-level signal into a bit stream whose bit length is quantized by two or greater integer step,
       wherein said step (b) comprises the steps of:
          (b1) checking a duration error in the converted bi-level signal and correcting the duration error; and
          (b2) converting the corrected duration of one level into bit streams whose length is quantized by N and converting the corrected duration of the other level into bit stream in whose length is quantized by M up to a predetermined length and by Q beyond the predetermined length, wherein said N is two or greater than 2, said M is a coprime of said N, and said Q is smaller than said M.

11. A data modulation apparatus, comprising:
    a storing means for storing modulation codes, each of the modulation codes containing more than two bit groups which are constituted in such a manner that the length of a bit group recorded into one of two recording phases of a recording medium is quantized by two or greater integer step; and
    a control means for extracting one of the modulation codes in said storing means according to an input data value,
       wherein the length of a bit group corresponding to one of the two recording phases is quantized by an integer N which is equal to or greater than 2 and the length of a bit group corresponding to the other recording phase is quantized by an integer M which is a coprime of said N.

12. An apparatus of claim 11, wherein the modulation codes further include additional bits for satisfying a run length limited rule when outputting each code in series.

13. A data modulation apparatus, comprising:
    a storing means for storing modulation codes, each of the modulation codes containing more than two bit groups which are constituted in such a manner that the length of a bit group recorded into one of two recording phases of a recording medium is quantized by two or greater integer step; and
    a control means for extracting one of the modulation codes in said storing means according to an input data value,
       wherein the length of a bit group corresponding to one of the two recording phases is quantized by an integer N which is equal to or greater than 2 and the length of a bit group corresponding the other recording phase is quantized by an integer M up to a predetermined length and is quantized by an integer Q beyond said predetermined length, wherein said M which is a coprime of said N and said Q is smaller than said M.

14. A data demodulation apparatus, comprising:
    a comparison means for converting a RF signal reproduced from the recording medium into a bi-level signal based on a reference level;
    a conversion means for converting the bi-level signal including a positive and a negative level into a bit stream;
    a control means for updating the bit stream for a positive or negative duration into a bit stream whose bit length is quantized by two or greater integer step; and
    an error detecting means for detecting a reproducing error with respect to the converted bit stream,
       wherein said control means updates the converted bit stream for one level, into one whose bit length is quantized by an integer N and updates the converted bit stream for the other level into one whose bit length is quantised by M if it is below or equal to a predetermined length and is quantized by an integer Q if greater than said predetermined length, wherein said M is a coprime of said N and said Q is smaller than said M.

15. An apparatus of claim 14, wherein said error detecting means detects a reproducing error based on whether the bit length of the converted bit stream satisfies a given quantizing condition.

16. A data recording medium, including modulated codes, each code containing more than two bit groups which are constituted in such a manner that the length of a bit group for one of two recording phases is quantized by an integer N which is equal to or greater than 2 and the length of a bit group for the other recording phase is quantized by an integer M which is a coprime of said N.

17. A data recording medium of claim 16, wherein the bit group length corresponding to the other recording phase is quantized by Q when the length exceeds a predetermined value, wherein said Q is smaller than said M.

18. A RLL (Run length Limited) data modulation method, comprising the step of forming more than two bit: groups of a modulation data in such a manner that the length of a bit group recorded into one of two recording phases of a recording medium is quantized by two or greater integer step, wherein the length of a bit group corresponding to one of the two recording phases is quantized by an integer N which is equal to or greater than 2 and the length of a bit group corresponding to the other recording phase is quantized by an integer M which is a coprime of said N.

19. A RLL (Run length Limited) data modulation method, comprising the step of forming more than two bit groups of a modulation data in such a manner that the length of a bit group recorded into one of two recording phases of a recording medium is quantized by two or greater integer step, wherein the length of a bit group corresponding to one of the two recording phases is quantized by an integer N which is equal to or greater than 2 and the length of a bit group corresponding the other recording phase is quantized by an integer M up to a predetermined length and is quantized by an integer Q beyond said predetermined length, wherein said M which is a coprime of said N and said Q is smaller than said M.

* * * * *